United States Patent [19]

Crooks et al.

[11] Patent Number: 5,140,107
[45] Date of Patent: Aug. 18, 1992

[54] DIGITIZER SCREEN AND METHOD OF MAKING

[75] Inventors: John F. Crooks; Kazem Memarzadeh; Robert L. Protheroe, all of Cambridge, Ohio

[73] Assignee: NCR Corporation, Dayton, Ohio

[21] Appl. No.: 724,620

[22] Filed: Jul. 2, 1991

[51] Int. Cl.⁵ .................. G08C 21/00; H01C 1/012
[52] U.S. Cl. .................................. 178/19; 178/18; 338/195; 338/211; 338/308
[58] Field of Search ................ 178/19, 18, 20; 338/195, 211, 307, 308

[56] References Cited

U.S. PATENT DOCUMENTS

| | | | |
|---|---|---|---|
| 3,266,005 | 8/1966 | Balde et al. | 338/211 |
| 3,591,718 | 7/1971 | Asano et al. | 178/19 |
| 3,617,666 | 11/1971 | Braue | 200/86 |
| 4,198,539 | 4/1980 | Pepper, Jr. | 178/18 |
| 4,435,616 | 3/1984 | Kley | 178/18 |
| 4,456,787 | 6/1984 | Schlosser et al. | 178/19 |
| 4,492,949 | 1/1985 | Peterson et al. | 338/114 |
| 4,523,654 | 6/1985 | Quayle et al. | 178/19 |
| 4,600,807 | 7/1986 | Kable | 178/19 |
| 4,636,582 | 1/1987 | Moriwaki et al. | 178/18 |
| 4,645,869 | 2/1987 | Rockwell et al. | 178/18 |
| 4,649,232 | 3/1987 | Nakamura et al. | 178/18 |
| 4,650,926 | 3/1987 | Nakamura et al. | 178/18 |
| 4,665,288 | 5/1987 | Kable et al. | 178/19 |
| 4,677,417 | 6/1987 | Amagishi | 338/114 |
| 4,678,869 | 7/1987 | Kable | 178/19 |
| 4,704,501 | 11/1987 | Taguchi et al. | 178/19 |
| 4,794,367 | 12/1988 | Ashe et al. | 338/308 |
| 4,822,957 | 4/1989 | Talmage, Jr. et al. | 178/18 |
| 4,853,493 | 8/1989 | Schlosser et al. | 178/18 |
| 4,914,416 | 4/1990 | Kunikane | 338/114 |

*Primary Examiner*—Stafford D. Schreyer
*Attorney, Agent, or Firm*—Albert L. Sessler, Jr.

[57] ABSTRACT

A digitizer screen and method of making. A coated conductive plastic film is perforated and is used in conjunction with a glass or other panel to provide a screen which may be used in an electronic digitizer for converting the position and movement of a stylus or other device on the screen to electrical signals representative of such positioning and movement. The perforated coated conductive plastic film may be laminated to the glass panel to form an integrated structure which does not require the use of masking and etching or similar processes to produce a desired apertured matrix pattern in the plastic film. Various arrangements of the plastic film are disclosed which facilitate the connection of the apertured portion of the plastic film to associated electronic components.

37 Claims, 6 Drawing Sheets

DIGITIZER SCREEN AND METHOD OF MAKING

BACKGROUND OF THE INVENTION

The present invention relates to a screen which can be used in a digitizer and to a method of making such a screen. More particularly, the invention relates to a screen which includes a sheet of conductive plastic material which is perforated and may be laminated to a sheet of rigid material, such as glass.

Digitizing devices which are capable of translating the positioning and movement of a stylus or other element on a screen into electrical signals representative of such positioning and movement are well known. One such device is the subject of U.S. Pat. No. 4,665,283, entitled "Electrographic Apparatus", inventors Robert G. Kable and Philip A. Schlosser, issued May 12, 1987. This patent shows a digitizer screen in which a resistive surface or sheet which may be formed of a layer of indium-tin-oxide is deposited onto a dielectric support material such as glass. Voids or discontinuities are formed in the resistive layer to increase the edge-to-edge resistances of the layer and to provide identical edge-to-edge resistances in the x- and y- coordinate directions for digitizers which are rectangular and non-square. The conductive coating on the glass is applied in a waffle-like pattern. Among the purposes served are the following. The decreased active area of the resistive layer minimizes electrical noise which might be introduced by capacitive coupling with the user's hand as it rests on the screen. The patterning allows the effective load of the digitizer screen to be optimized for both the drive electronics and the transparent conductive coating manufacturing process. Transparent conductive coatings, such as the indium tin oxide coating described in the patent, achieve lowest cost, optimal uniformity, and highest durability only at low sheet resistances (somewhere on the order of 200 ohms/square) due to manufacturing limitations. The circuitry used to drive the digitizer screen, however, works best at higher sheet resistances. The patterning effectively increases the overall sheet resistance, thus allowing a compromise between the two. By making the squares of the waffle pattern rectangular instead of square, the effective load presented to the drive electronics can be made the same in both the x- and y- directions. Otherwise, due to the different characteristics in the two directions, one direction would be more susceptible to noise pickup than the other. Also, overall light transmission is improved by the patterning. The conductive coating tends to block light and create glare.

An improved film or coating which is used in association with the glass or other rigid element, and which results in lower cost and increased durability, would be advantageous.

SUMMARY OF THE INVENTION

In the present invention, a conductive coated plastic film is used in association with a glass or other substrate, in place of conductive coated glass, in order to form the screen for a digitizer. Instead of applying conductive coating to the substrate in a prescribed pattern, holes are punched in the conductive coated plastic film which is used in association with the glass or other substrate. One advantage which derives from this arrangement is lower cost, since conductive coated plastic is less expensive than glass, and punching holes is less expensive than patterning the conductive material during application. A second advantage is increased durability. Conductive coated plastic does not shatter. The conductive coated plastic could be mounted behind a sheet of textured glass upon which the user of the digitizer would write. Even if the glass were to break, the digitizer itself would not need to be replaced. Only the glass itself would require replacement if the conductive coated plastic film were not bonded thereto; or, if the perforated plastic film were laminated to the glass, then that combined structure would need to be replaced.

In accordance with one embodiment of the invention, a process for fabricating a screen for use in an electronic digitizer comprises the following steps: (a) selecting a sheet of conductive coated plastic material; (b) perforating said sheet to provide a plurality of apertures in a matrix pattern; and (c) laminating said perforated sheet to a sheet of rigid material.

In accordance with another embodiment of the invention, as an article of manufacture, a conductive coated plastic film has a plurality of spaced apertures therein laminated to a rigid material which is of similar shape and size to the conductive coated plastic film.

In accordance with another embodiment of the invention, a screen for an electronic digitizer comprises: a rigid element on which a stylus or similar device may be moved to operate the digitizer; and a sheet of conductive coated plastic film having a plurality of apertures in a matrix arrangement therein laminated to the rigid element and having a portion extending beyond the element, on which portion electronic components are mounted.

In accordance with another embodiment of the invention, a digitizer comprises: a housing for the digitizer; a rigid element mounted in the housing and having an outer surface on which a stylus or similar device may be moved to operate the digitizer; a sheet of conductive coated plastic film having a plurality of apertures in a matrix arrangement therein positioned adjacent to the rigid element in operative relation thereto; means retaining said plastic film in operative relation to said rigid elements; and means for determining the position of the stylus with respect to the rigid element by measuring electrical values in two dimensions across said plastic film.

It is accordingly an object of the present invention to provide a novel method for fabricating a screen which may be used in a digitizer.

Another object is to provide an article of manufacture comprising a conductive coated apertured plastic film laminated to a rigid material.

Another object is to provide a screen for an electronic digitizer.

Another object is to provide an electronic digitizer having a screen comprising a rigid element and a conductive coated apertured plastic film associated therewith.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
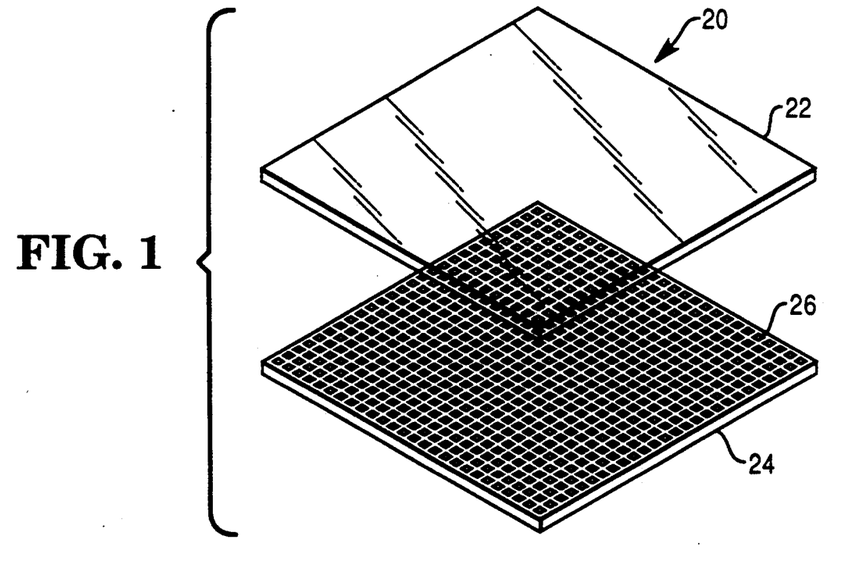
FIG. 1 is an exploded perspective view showing a perforated conductive coated plastic film associated with a rigid element with which it is combined to form a digitizer screen.

Referring now to FIG. 1, shown there is an exploded perspective view of a screen 20 comprising a rigid transparent element or panel 22 which may be of glass or other suitable material, which is in separated aligned relationship with a perforated conductive coated plastic film 24. The panel 22 and film 24 shown in FIG. 1 are of the same shape and size. The film 24 contains a plurality of small apertures 26 which are of the same shape as the panel 22 and film 24. In the illustrated embodiment, the panel 22, the film 24 and the apertures 26 are all square in shape.

The element 22 and the film 24 can be combined to form a device which can be used, for example, as a screen 20 of an electronic digitizer. In such a device 20, the electrically conductive plastic film 24 is used to detect the position and movement of a stylus or similar device placed in operative relation to the panel 22.

Figure 2:
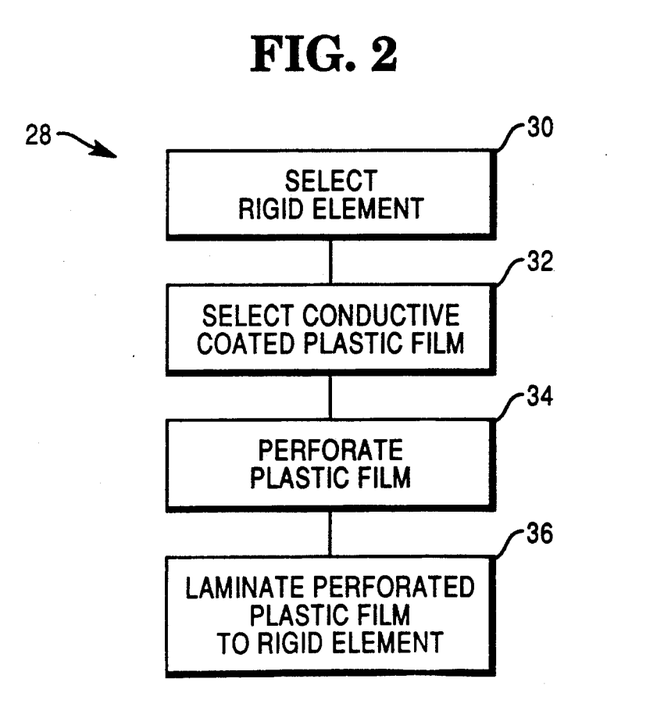
FIG. 2 is a flow diagram illustrating a process for fabricating a digitizer screen comprising a perforated conductive coated plastic film laminated on a glass panel.

A process 28 for forming a screen 20 in accordance with the present invention is shown in FIG. 2. The first step 30 in this process comprises selection of the rigid element or panel 22 to be used in the digitizer screen 20 or other device to be fabricated. A sheet of glass of suitable strength and transparent quality may suitably be used for the panel 22, though other material, such as a suitable plastic, could be used if desired. In the next step 32 a suitable conductive coated plastic film or sheet 24 is selected. One suitable plastic film is designated Altair 0200DX, marketed by Southwall Technologies, Palo Alto, Calif. Another suitable plastic film is called Bradyflex (TM) ITO-300, marketed by W. H. Brady Corporation, Milwaukee, Wis.

In step 34, the plastic film 24 is perforated by a suitable punching or perforating device. The punching of holes or apertures 26 may be carried out in any appropriate manner and would customarily be accomplished by using a tool which includes a plurality of punches or dies arranged in a matrix pattern to produce all of the desired punches for a given piece of plastic film in one operation, with all of the punches operating in parallel. However, if desired, punching could be accomplished in a serial manner, either on a hole-by-hole basis, or by punching an entire row or column at one time, and then shifting the plastic film to present another area for punching.

Next, in step 36, the plastic film 24, which is now perforated, is laminated to the glass or other rigid panel 22, by any appropriate bonding method. This produces a screen 20 in which the conductive coated plastic film 24, having a matrix of apertures 26, is permanently fixed to the panel 22.

If desired, and if the plastic film 24 is sufficiently rigid, the film 24 need not be permanently bonded to the panel 22, but can be retained adjacent thereto by some external securing means, such as a bracket, which maintains the panel 22, and the plastic film 24 in closely-spaced operative relationship. Such an arrangement has the advantage that if the panel 22 is broken or otherwise damaged, it can be replaced without also replacing the plastic film 24 or otherwise disturbing the interconnections of the plastic coating thereon with other electronic components of the digitizer or other device in which the screen 20 is used.

Figure 3:
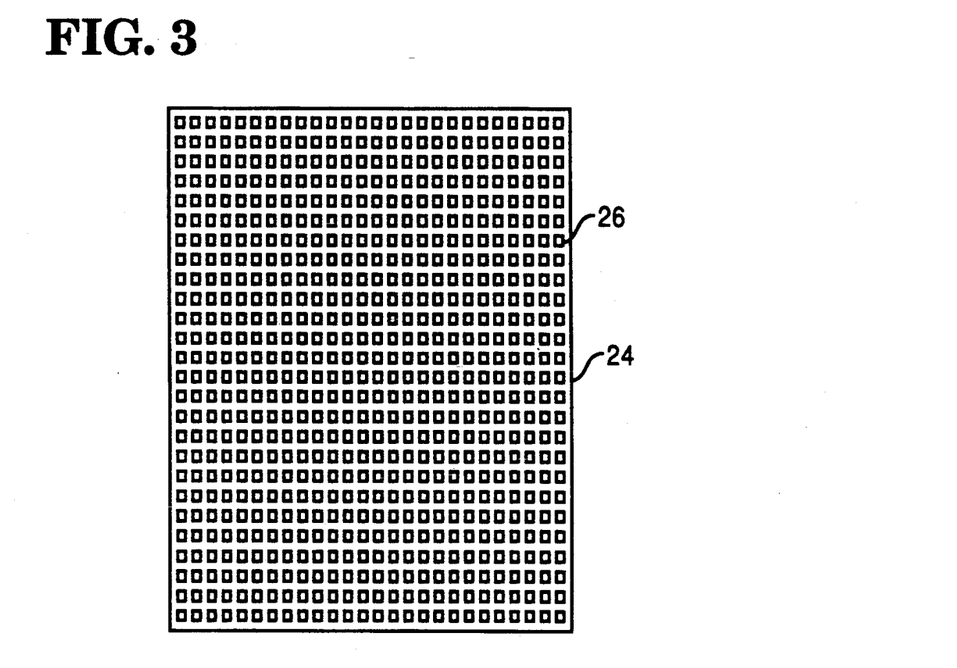
FIG. 3 is a plan view of a perforated conductive coated plastic film of rectangular shape having a perforated matrix of rectangular-shaped apertures therein.
Figure 4:
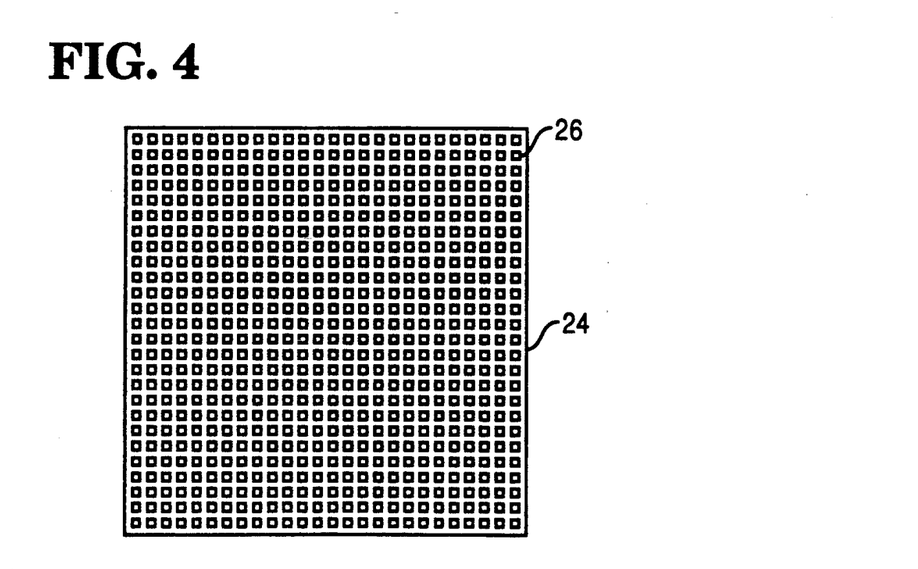
FIG. 4 is a plan view of a perforated conductive coated plastic film of square shape having a perforated matrix of square-shaped apertures therein.

Shown in FIGS. 3 and 4 are two configurations of plastic film 24 having apertures 26. In the configuration of FIG. 3, the shape of the film 24 is rectangular and the individual apertures 26 are also rectangular, with the height and width dimensions of the apertures bearing the same relationship to the height and width dimensions of the sheet itself. Similarly, in FIG. 4, there is shown a special case of the rectangular arrangement of FIG. 3, in which both the exterior configuration of the film 24 and the individual apertures 26 are square in configuration.

Figure 5:
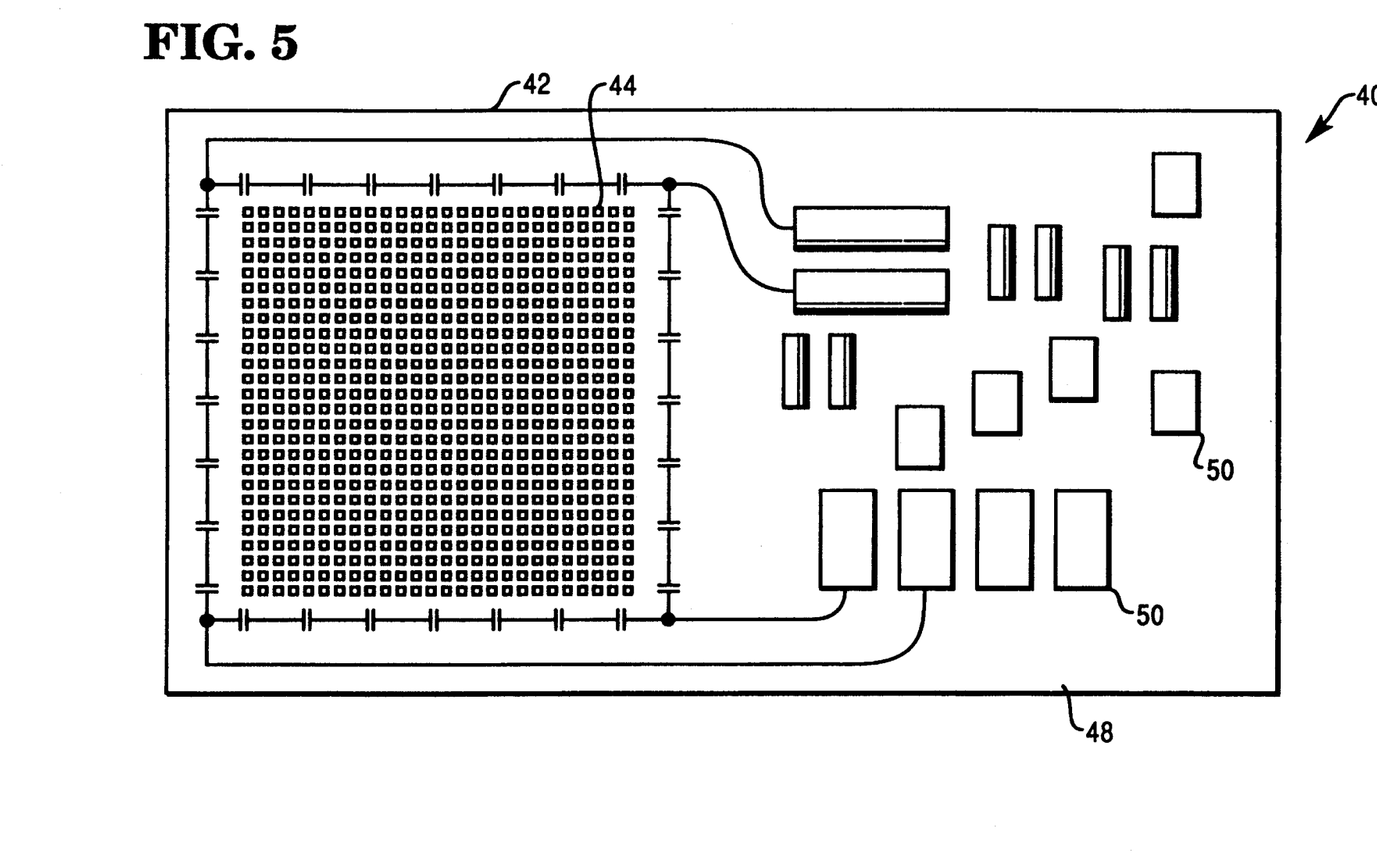
FIG. 5 is a plan view of a plastic film having a perforated conductive portion and an extended portion on which electronic components may be mounted.
Figure 6:
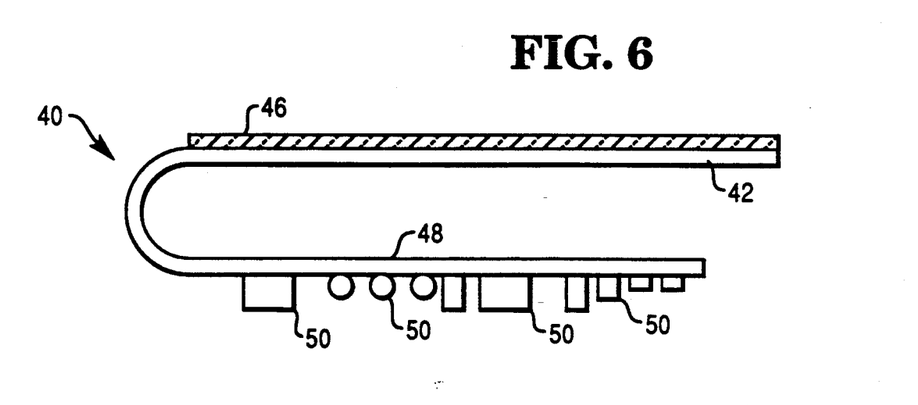
FIG. 6 is an elevation view of the plastic film of FIG. 5, showing the extended portion twined under the perforated conductive portion.

In FIGS. 5 and 6, another embodiment of the invention is shown in which a conductive coated plastic film 40 is elongated in shape and includes, in addition to a perforated portion 42, having apertures 44, which is positioned beneath a rigid element such as a glass panel 46, a further portion 48 on which a plurality of electronic components 50 may be mounted. If desired, for purpose of compactness in installing the resulting assembly in a digitizer, the further portion 48 may be bent beneath the perforated portion 42, as shown in FIG. 6. The plastic film 40 may contain appropriate conductive paths therein to enable the various electronic components 50 to be connected to each other and to the apertured portion 42 in any desired circuit arrangement.

Figure 7:
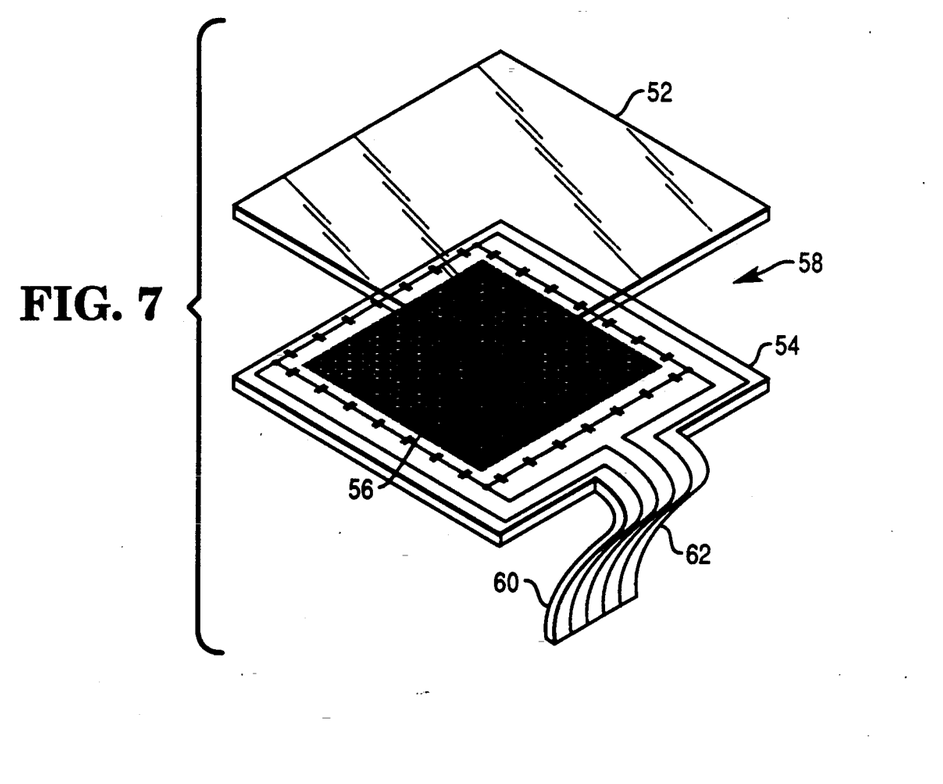
FIG. 7 is a perspective view of a plastic film having a perforated conductive portion and an extended portion integral therewith in the form of a long tab having conductive lines positioned thereon.

A further embodiment of the invention is shown in FIG. 7, wherein a rigid panel 52 and a coated conductive plastic film 54 having an apertured portion 56 coact to provide a screen 58 for use in appropriate apparatus such as a digitizer. The plastic film 54 includes an extended portion 60 which provides support for a plurality of conductors 62 which are connected at one end to conductive elements in the apertured portion 56 of the film 54 and which may be connected at the other end to electronic components in the digitizer or other apparatus in which the screen 58 is used. This arrangement is advantageous in that it eliminates the need for one set of connections which would otherwise have to be made between the apertured portion 56 and a set of conductors leading to electronic components in the apparatus in which the screen is used.

Figure 8:
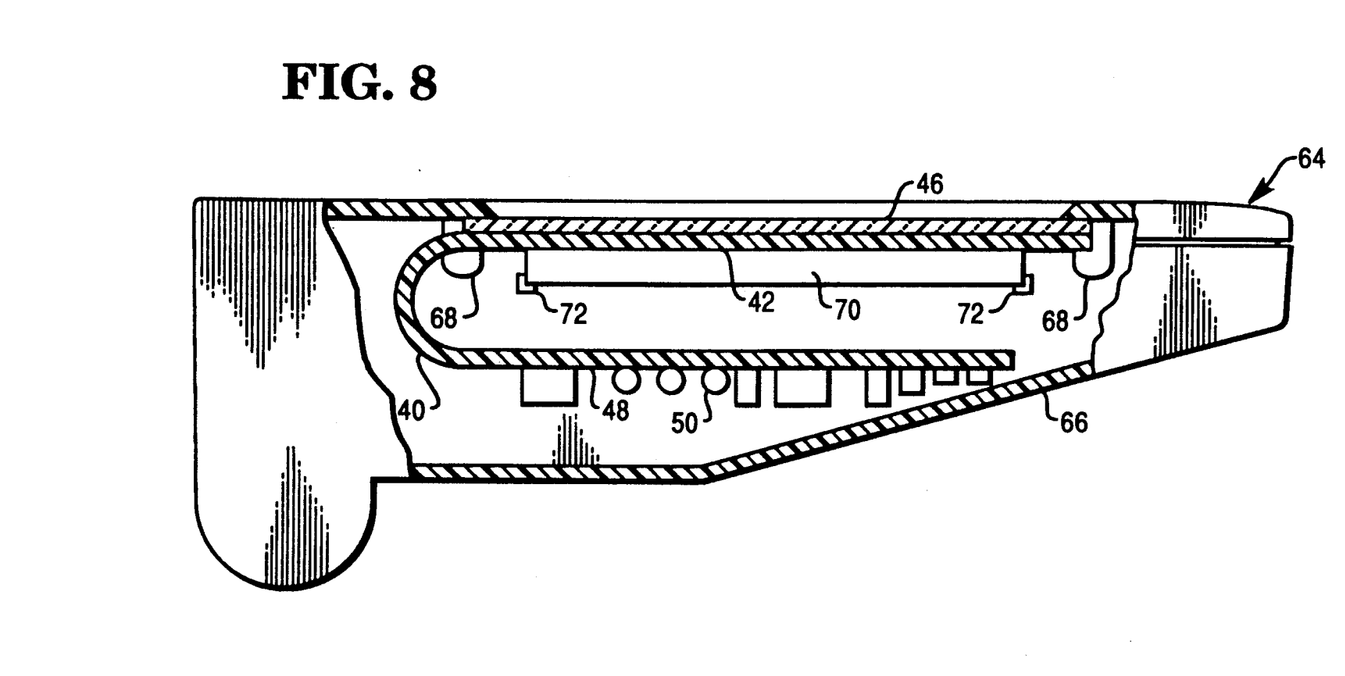
FIG. 8 is a sectional elevation view of a digitizer showing a screen which includes a plastic film of the type shown in FIG. 5.

Shown in FIG. 8 is a sectional elevational view of a digitizer 64 in which the embodiment of FIGS. 5 and 6 is employed. The plastic film 40 is disposed beneath a glass panel 46 within the housing 66 of the digitizer 64, and is supported therein by suitable supports such as brackets 68. It may be noted that this arrangement can be used whether the film 40 is laminated to the glass panel 46, or is physically separate therefrom and located in close physical proximity thereto. A display device 70 is positioned beneath the glass panel 46 and associated plastic film 40 and is held in position by suitable mounting devices 72. The lower portion of the film 40 is bent beneath the perforated portion 42 and contains a plurality of electronic components 50 mounted thereon.

Figure 9:
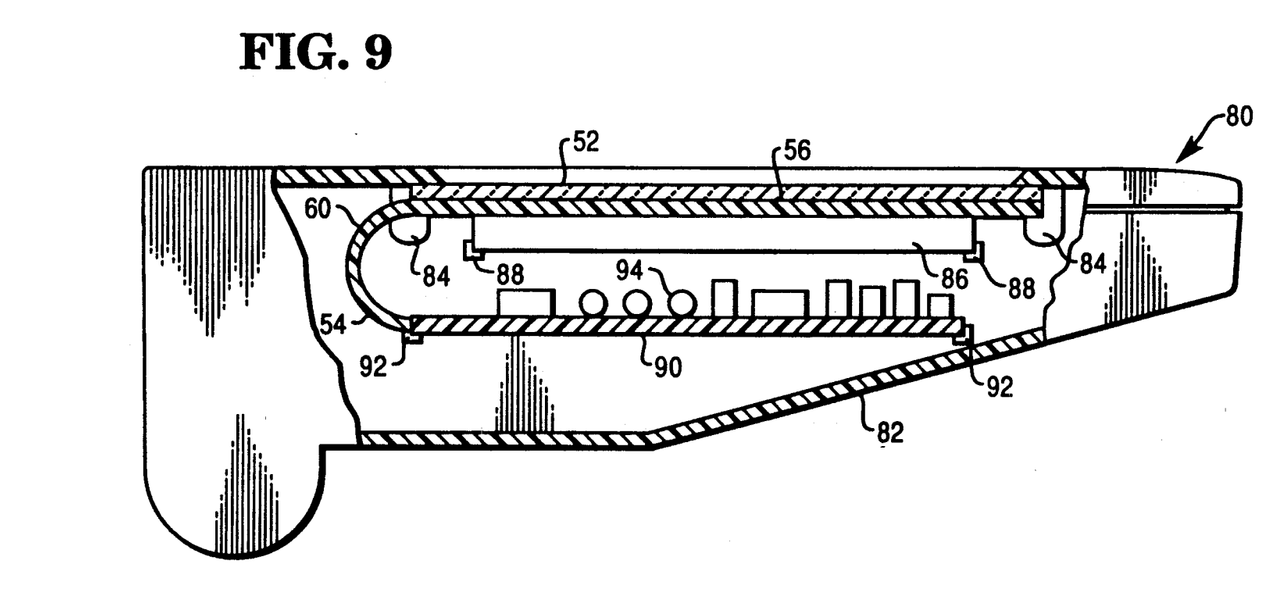
FIG. 9 is a sectional elevation view of a digitizer showing a screen which includes a plastic film of the type shown in FIG. 7.

Shown in FIG. 9 is a sectional elevational view of a digitizer 80 in which the embodiment of FIG. 7 is employed. The apertured portion 56 of the plastic film 54 is disposed beneath the glass panel 52 within the housing 82 of the digitizer 80, and is supported therein by suitable supports such as brackets 84. Here again, as in the embodiment of FIG. 8, this arrangement can be used whether the apertured portion 56 of the film 54 is laminated to the glass panel 52, or is physically separate therefrom but located in close physical proximity thereto. A display device 86 is positioned beneath the glass panel 52 and the associated apertured portion 56 of the plastic film 54, and is held in position by suitable mounting devices 88. The extended portion 60 of the film 54 is connected to a circuit board 90 which is supported within the housing 82 by supports 92, and on which appropriate electrical components 94 are mounted. This arrangement permits the circuit components 94 to remain within the digitizer 80 when the glass panel 52 and associated plastic film 56 are removed.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A process for fabricating a screen for use in an electronic digitizer, comprising the following steps:
   (a) selecting a sheet of rigid material;
   (b) selecting a sheet of conductive coated plastic material;
   (c) perforating said sheet of plastic material to provide a plurality of apertures in a matrix pattern; and
   (d) laminating said perforated sheet of plastic material to said sheet of rigid material.

2. The process of claim 1, in which said apertures are rectangular in shape.

3. The process of claim 2, in which said sheets of plastic material and rigid material are of a rectangular configuration.

4. The process of claim 1, in which said apertures are square in shape.

5. The process of claim 4, in which said sheets of plastic material and rigid material are of a square configuration.

6. The process of claim 1, in which said sheet of conductive coated plastic material is made from Altair 0200DX material.

7. The process of claim 1, in which said sheet of conductive coated plastic material is made from ITO-300 material.

8. The process of claim 1, in which said sheet of rigid material is transparent.

9. The process of claim 1, in which said sheet of rigid material is glass.

10. As an article of manufacture, a conductive coated plastic film having a plurality of spaced punched-out apertures therein laminated to a rigid material which is of similar shape and size to the conductive coated plastic film.

11. The article of claim 10, in which the apertures are of rectangular configuration.

12. The article of claim 10, in which the apertures are of square configuration.

13. The article of claim 11, in which the apertures are in a matrix arrangement.

14. The article of claim 12, in which the apertures are in a matrix arrangement.

15. The article of claim 10, in which the plastic film is made of Altair 0200DX material.

16. The article of claim 10, in which the plastic film is made of ITO-300 material.

17. The article of claim 11, in which the rigid material is of rectangular configuration.

18. The article of claim 12, in which the rigid material is of square configuration.

19. The article of claim 10, in which the rigid material is transparent.

20. A screen for an electronic digitizer, comprising:
   a rigid element on which a stylus or similar device may be moved to operate the digitizer; and
   a sheet of conductive coated plastic film having a plurality of apertures in a matrix arrangement therein laminated to the rigid element and having a portion extending beyond the element, on which portion electronic components are mounted.

21. The screen of claim 20, in which the portion of the plastic film extending beyond the rigid element and on which electronic components are mounted is bent under the screen.

22. The screen of claim 20, in which the rigid element is transparent.

23. The screen of claim 20, in which the apertures are rectangular in shape.

24. The screen of claim 20, in which the apertures are square in shape.

25. A screen for an electronic digitizer, comprising:
   a rigid element on which a stylus or similar device may be moved to operate the digitizer; and
   a sheet of conductive coated plastic film having a plurality of apertures in a matrix arrangement therein laminated to the rigid element and having a portion extending beyond the element and configured as a long tab having conductive lines positioned thereon to form a connector.

26. The screen of claim 25, in which the rigid element is transparent.

27. The screen of claim 25, in which the apertures are rectangular in shape.

28. The screen of claim 25, in which the apertures are square in shape.

29. A digitizer comprising:
   a housing for the digitizer;
   a rigid element mounted in the housing and having an outer surface on which a stylus or similar device may be moved to operate the digitizer;
   a sheet of conductive coated plastic film having a plurality of apertures in a matrix arrangement therein positioned adjacent to the rigid element in operative relation thereto;
   means retaining said plastic film in operative relation to said rigid element; and means for determining the position of the stylus with respect to the rigid element by measuring electrical values in two dimensions across said plastic film.

30. The digitizer of claim 29, in which the apertures in the plastic film are rectangular in shape.

31. The digitizer of claim 29, in which the apertures in the plastic film are square in shape.

32. The digitizer of claim 29, in which the rigid element is transparent.

33. The digitizer of claim 32, in which the plastic film is also transparent.

34. The digitizer of claim 32, also including a display device mounted in said housing beneath said rigid element and said plastic film and visible therethrough.

35. The digitizer of claim 29, in which the plastic film has a portion extending beyond the rigid element and folded thereunder, on which the means for determining the position of the stylus is located.

36. The digitizer of claim 29, in which the plastic film has a portion extending beyond the rigid element and is configured as a long tab having conductive lines positioned thereon, said extending portion being coupled to said means for determining the position of the stylus.

37. The digitizer of claim 29, in which the sheet of conductive coated plastic film is laminated to the rigid element.

* * * * *